Jan. 31, 1933.  J. C. McCUNE  1,895,476
SAFETY CAR CONTROL DEVICE
Filed April 21, 1930
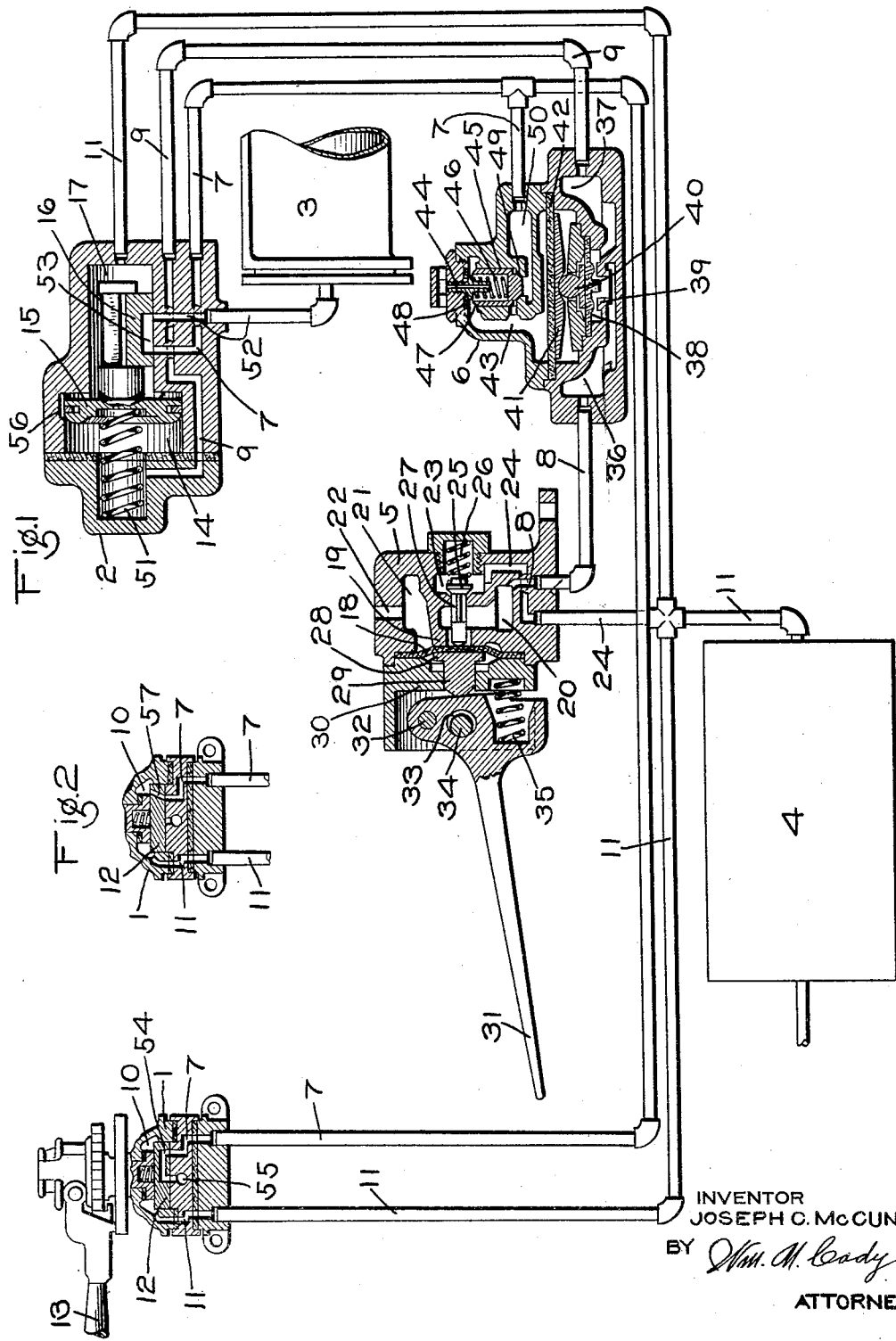
INVENTOR
JOSEPH C. McCUNE
BY Wm. M. Cady
ATTORNEY Patented Jan. 31, 1933

1,895,476

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR CONTROL DEVICE

Application filed April 21, 1930. Serial No. 445,860.

This invention relates to fluid pressure brakes and more particularly to that type in which the brakes are applied in the event of the incapacitation of the operator.

The principal object of my invention is to provide an improved safety car control equipment.

Another object of my invention is to provide an improved foot valve device for safety car control equipment, which device is subject to manual pressure for supplying fluid under pressure to a control pipe of the equipment and which is operative upon the relief of manual pressure to vent fluid under pressure from the control pipe to effect an application of the brakes automatically.

Other objects and advantages will appear in the following more detailed description of my invention.

In the accompanying drawing; Fig. 1 is a diagrammatic view, mainly in section, of a fluid pressure brake equipment embodying my invention, the several parts of the equipment being shown in running positions; and Fig. 2 is a fragmentary sectional view showing the brake valve device in application position.

As shown in the drawing, the fluid pressure brake equipment may comprise a brake valve device 1, an emergency valve device 2, a brake cylinder 3, a main reservoir 4, a foot valve device 5, a cut-off valve device 6, a straight air pipe 7 and a safety control connection which may comprise pipes 8 and 9.

The brake valve device 1 may comprise a casing having a chamber 10 constantly connected to the main reservoir 4 through a pipe and passage 11 and containing a rotary valve 12 having an operating stem which is adapted to be rotated through the medium of the usual operating handle 13.

The emergency valve device 2 may comprise a casing having a piston chamber 14 connected to the safety control passage and pipe 9 and containing a piston 15 which is subject to the pressure of a spring 51 and which is adapted to operate a slide valve 16 contained in a chamber 17 constantly connected to the main reservoir 4 through the main reservoir pipe 11.

The foot valve device 5 may comprise a casing having a flexible diaphragm 18 mounted therein, one side of which is adapted to seat on a seat ring 19 formed on the casing and acts as a valve to control communication from a chamber 20 connected to the safety control pipe 8, and a chamber 21 open to the atmosphere through a passage 22. The casing also has a chamber 23 constantly connected to the main reservoir 4 through the main reservoir pipe 11 and a branch pipe and passage 24 and contains a valve 25 which is subject to the pressure of a coil spring 26 also contained in the chamber 23. The valve 25 is provided with a fluted stem 27, the outer end of which is in engagement with the side of the diaphragm which is adapted to seat on the seat ring 19.

Engaging the other side of the diaphragm 18 is a follower 28 having an operating stem 29 which is slidably mounted in a wall 30 of the casing. The outer end of this stem extends beyond the outer surface of the wall 30 and is operatively engaged by a foot pedal 31 which is pivotally supported by a pin 32 secured to the casing. Secured to the casing and extending through an opening 33 in the foot pedal is a pin 34, the opening being of greater diameter than the pin so as to permit a limited movement of the pedal. Interposed between and engaging the pedal 31 and the casing is a coil spring 35, the pressure of which tends, at all times, to rotate the pedal in a clockwise direction about the pin 32.

The cut-off valve device 6 may comprise a casing having a passage 36 which is connected to the chamber 20 in the foot valve device through the safety control pipe and passage 8 and having a passage 37 which is connected with the emergency piston chamber 14 through the safety control pipe and passage 9. Communication between the passages 36 and 37 is controlled by a flexible diaphragm 38 mounted in the casing. This diaphragm serves as a valve and the under side thereof is adapted to seat on a seat ring 39 to close communication between the passages 36 and 37. Engaging the other side of the diaphragm 38 is a follower member 40, the upper end of which is engaged by a follower plate 41 in engagement with the under side of a flexible diaphragm 42 mounted in the casing. At the upper side of the diaphragm 42, a chamber 43 is formed which is normally connected to atmosphere through a passage 44.

The cut-off valve device also comprises a valve piston 45 which is subject at one side to the pressure of a spring 46 and which has a valve 47 at one end adapted to seat an annular gasket 48 to close communication from the chamber 43 to the atmosphere, and also has a valve 49 which is adapted to control communication from a chamber 50 to which the straight air pipe 7 is connected.

In running the car, the brake valve device will be in release position and the operator will, by the use of his foot, maintain the foot pedal 31 of the foot valve device 5 depressed.

With the brake valve device in release position, the brake cylinder 3 is connected to the atmosphere through a pipe and passage 52, a cavity 53 in the emergency slide valve 16, the straight air passage and pipe 7, a cavity 54 in the rotary valve 12 and a passage 55.

Fluid under pressure is supplied from the main reservoir 4 to the rotary valve chamber 10 in the brake valve device and to the slide valve chamber 17 in the emergency valve device through the main reservoir pipe 11, and with the foot pedal 31 maintained depressed, the flexible diaphragm 18 will be maintained seated against the seat ring 19 through the medium of the foot pedal 31, follower stem 29 and follower 28, thus closing communication from the chamber 20 to the chamber 21. With the flexible diaphragm thus seated, the valve 25 will, due to the end of its stem being in engagement with the diaphragm 18, be maintained unseated against the pressure of the spring 26, so that fluid under pressure from the main reservoir 4 is supplied to the emergency piston chamber 14 through the main reservoir pipe 11, branch pipe and passage 24, valve chamber 23 in the foot valve device 5, past the unseated valve 25 and its fluted stem 27, through chamber 20, safety control passage and pipe 8, passage 36 in the cut-off valve device 6, past the unseated flexible diaphragm 38, passage 37 and pipe and passage 9. Since the pressures on both sides of the emergency piston 15 are substantially equal, being maintained so through the usual feed groove 56, the pressure of the spring 51 will maintain the piston in its extreme right hand position as shown in Fig. 1.

If, when the brake valve device 1 is in release position, the operator's foot pressure on the foot pedal 31 should be removed, the pressure of the spring 35 of the foot valve device causes the foot pedal to rotate in a clockwise direction about its pivot pin 32, thus relieving the follower stem 29, follower 28 and flexible diaphragm 18 of inward pressure, so that the pressure of fluid present in the chamber 20 will cause the flexible diaphragm to flex toward the left hand, unseating it from the seat ring 19 and moving the follower 28 and stem 29 outwardly. When the diaphragm is thus moved from its seat ring 19, its pressure on the end of the valve stem 27 is relieved so that the pressure of the spring will cause the valve 25 to shift toward the left hand and seat.

With the valve 25 seated, the supply of fluid under pressure from the chamber 23, as supplied from the main reservoir 4, to the chamber 20 is closed off and with the diaphragm 18 unseated from its seat ring 19, fluid under pressure from the emergency piston chamber 14 is discharged to the atmosphere by way of the safety control passage and pipe 9, passage 37 in the cut-off valve device 6, past the unseated diaphragm 38 of the cut-off valve device, through passage 36, pipe and passage 8, chamber 20 in the foot valve device, past the unseated diaphragm 18, through chamber 21 and passage 22. Upon thus venting fluid under pressure from the emergency piston chamber 14, fluid under pressure present in the valve chamber 17 and acting on one side of the emergency piston 15, causes said piston shift to its extreme left hand or emergency position, carrying with it the slide valve 16. With the slide valve in emergency position, the passage and pipe 7 leading to the atmosphere by way of the brake pipe 1 is lapped and the brake cylinder passage 52 is uncovered. By the uncovering of the passage 52, fluid under pressure flows from the valve member 17 to the brake cylinder 3 through passage and pipe 52, thus effecting an emergency application of the brakes.

To release such an application of the brakes, the foot pedal must be depressed to the position shown in Fig. 1, in which the diaphragm 18 closes the atmospheric communication from the emergency piston chamber and in which the valve 25 is unseated, establishing communication through which fluid under pressure is again supplied from the main reservoir 4 to the emergency piston chamber 14. Now when the pressure of fluid in the emergency piston chamber is substantially equal to the pressure of fluid in the emergency valve chamber 17, the pressure of the spring 51 will cause the emergency piston 15 to move to its extreme right hand position, carrying with it the slide valve 16. With the slide valve thus returned to its normal position, the communication from the valve chamber 17 to the brake cylinder 3 is closed off and fluid under pressure is discharged from the brake cylinder to the atmosphere by way of pipe and passage 52, cavity 53 in the emergency slide valve 16, passage and pipe 7, cavity 54 in the rotary valve 12 of the brake valve device 1 and passage 55.

To effect a service application of the brakes, the operator maintains his foot pressure on the pedal 31 and moves the brake valve device to application position as shown in Fig. 2 of the drawing, in which position, a port 57 in the rotary valve 12 registers with the passage 7 so that fluid under pressure from the rotary valve chamber, as supplied from the main reservoir 4, flows to the brake cylinder 3 through the port 57, passage and pipe 7, cavity 53 in the emergency slide valve 16 and the brake cylinder passage and pipe 52.

Fluid under pressure thus supplied to the straight air pipe 7 also flows to the chamber 50 in the cut-off valve device 6, and when the pressure of fluid in this chamber and acting on one side of the cut-off valve piston 45 is sufficient to overcome the opposing pressure of the spring 46, the valve piston will move upwardly, seating the valve 47 and unseating the valve 49. With the valve 47 seated, the atmospheric communication from the diaphragm chamber 43 is closed and with the valve 49 unseated, fluid under pressure from the chamber 50 flows to the chamber 43.

The area of the flexible diaphragm 42 over which fluid under pressure in the chamber 43 acts is greater than that of the flexible diaphragm 38 over which the pressure of fluid in the passages 36 and 37 acts so that when fluid under pressure is supplied to the chamber 43, the diaphragm will flex downwardly and through the medium of the follower 41 and member 40, causing the diaphragm 38 to seat on the seat ring 39 and close communication between the passages 36 and 37.

It will thus be seen that since in effecting a straight air application of the brakes, the diaphragm 38 seats on the seat ring 39, the operator may remove his foot from the foot pedal 31 without causing an emergency application of the brakes.

To release the brake after a straight air application, the operator maintains the foot pedal 31 of the foot valve device 6 depressed as shown in Fig. 1 and moves the brake valve device 1 to release position, again connecting the straight air passage and pipe 7 to the atmosphere and venting fluid under pressure from the brake cylinder 3 and from the chamber 50 in the cut-off valve device. When the pressure of fluid in the chamber has been reduced a predetermined degree, the pressure of the spring 46 of the cut-off valve device causes the valve piston 45 to move downwardly, seating the valve 49 and unseating the valve 47. With the valve 47 unseated, fluid under pressure in the chamber 43 is discharged to the atmosphere through the passage 44. Now as the pressure of fluid in the chamber 43 is reduced, fluid under pressure acting on the under side of the flexible diaphragm 38 causes said diaphragm 38 to flex upwardly from its seat 39 carrying with it the member 40 and follower 41.

If after a straight air application of the brakes has been effected, the operator should remove his foot from the foot pedal 31 of the foot valve device and attempt to release the brakes by moving the brake valve device 1 to release position without first depressing the foot pedal, the emergency valve device 2 will be caused to operate to emergency position as soon as the flexible diaphragm 38 is unseated, since with the diaphragm 38 unseated, communication from the emergency piston chamber 14 to the atmosphere is open.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a safety car control equipment, the combination with a control pipe, of a valve device subject to manual pressure for supplying fluid under pressure to the control pipe and operative upon the relief of manual pressure for venting fluid under pressure from the control pipe to effect an application of the brakes, manually controlled means for supplying fluid under pressure to effect an application of the brakes, and means operated by fluid supplied in manually applying the brakes for closing off the flow of fluid from the control pipe when said valve device is relieved of manual pressure.

2. In a safety car control equipment comprising a brake cylinder and a brake valve device for normally controlling the supply of fluid under pressure to the brake cylinder, of a control pipe, a valve device operated upon a reduction in control pipe pressure for supplying fluid under pressure to the brake cylinder, and a foot valve device subject to foot pressure for normally maintaining the pressure of fluid in said control pipe and operative upon the relief of foot pressure for reducing the pressure of fluid in the control pipe.

3. In a safety car control equipment comprising a brake cylinder and a brake valve device for normally controlling the supply of fluid under pressure to the brake cylinder, of a control pipe, a valve device operated upon a reduction in control pipe pressure for supplying fluid under pressure to the brake cylinder, and a foot valve device subject to foot pressure for normally maintaining the pressure of fluid in said control pipe and operative upon the relief of foot pressure for reducing the pressure of fluid in the control pipe, said foot valve device comprising a valve operative to control the venting of fluid under pressure from the control pipe, and a valve controlled by the first mentioned valve for controlling the supply of fluid under pressure to the control pipe.

4. In a safety car control equipment comprising a brake cylinder and a brake valve device for normally controlling the supply of fluid under pressure to the brake cylinder, of a control pipe, a valve device operated upon a reduction in control pipe pressure for supplying fluid under pressure to the brake cylinder, and a foot valve device subject to foot pressure for normally maintaining the pressure of fluid in said control pipe and operative upon the relief of foot pressure for reducing the pressure of fluid in the control pipe, said foot valve device comprising a valve operative to control the venting of fluid under pressure from the control pipe, a valve controlled by the first mentioned valve for controlling the supply of fluid under pressure to the control pipe, and foot controlled means for controlling the operation of the first mentioned valve.

5. In a safety car control equipment comprising a brake cylinder and a brake valve device for normally controlling the supply of fluid under pressure to the brake cylinder, of a control pipe, a valve device operated upon a reduction in control pipe pressure for supplying fluid under pressure to the brake cylinder, and a foot valve device subject to foot pressure for normally maintaining the pressure of fluid in said control pipe and operative upon the relief of foot pressure for reducing the pressure of fluid in the control pipe, said foot valve device comprising a diaphragm valve operative to control the venting of fluid under pressure from the control pipe, a valve controlled by said diaphragm valve for controlling the supply of fluid under pressure to the control pipe, a follower member for controlling the operation of said diaphragm valve, and a foot pedal for controlling the operation of said follower member.

6. A foot valve device for a safety car control equipment having a control pipe and a fluid pressure supply source, said foot valve device comprising a casing, a valve mounted in said casing for controlling communication from said pipe to the atmosphere, another valve operatively mounted in said casing and controlled by the first mentioned valve for controlling communication from said fluid pressure supply source to said control pipe, and foot controlled means for controlling the operation of the first mentioned valve.

7. A foot valve device for a safety car control equipment having a control pipe and a fluid pressure supply source, said foot valve device comprising a casing, a diaphragm valve mounted in said casing for controlling communication from said control pipe to the atmosphere, and a valve operatively mounted in said casing and controlled by the diaphragm valve for controlling communication from the fluid pressure supply source to said control pipe, said diaphragm valve and valve being subject to manual pressure for respectively closing the communication from the control pipe to the atmosphere and establishing communication from the fluid pressure supply source to the control pipe.

8. A foot valve device for a safety car control equipment having a control pipe and a fluid pressure supply source, said foot valve device comprising a casing, a valve mounted in said casing for controlling communication from said pipe to the atmosphere, another valve operatively mounted in said casing and controlled by the first mentioned valve for controlling communication from said fluid pressure supply source to said control pipe, and foot controlled means for controlling the operation of the first mentioned valve and operative upon the relief of manual pressure for respectively establishing the communication from the control pipe to the atmosphere and closing the communication from the fluid pressure supply source to the control pipe.

In testimony whereof I have hereunto set my hand, this 17th day of April, 1930.

JOSEPH C. McCUNE.